(12) United States Patent
Hack et al.

(10) Patent No.: US 7,143,223 B2
(45) Date of Patent: Nov. 28, 2006

(54) METHOD, SYSTEM AND PROGRAM PRODUCT FOR EMULATING AN INTERRUPT ARCHITECTURE WITHIN A DATA PROCESSING SYSTEM

(75) Inventors: Mark Elliott Hack, Cedar Park, TX (US); Michael Stephen Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 10/965,154

(22) Filed: Oct. 14, 2004

(65) Prior Publication Data

US 2006/0085179 A1    Apr. 20, 2006

(51) Int. Cl.
G06F 13/24    (2006.01)
G06F 13/26    (2006.01)
G06F 13/00    (2006.01)

(52) U.S. Cl. .................. 710/266; 710/260; 710/268; 710/108

(58) Field of Classification Search ......... 710/260–269
See application file for complete search history.

(56) References Cited

U.S. PATENT DOCUMENTS

| | | | |
|---|---|---|---|
| 5,481,725 A * | 1/1996 | Jayakumar et al. | 710/48 |
| 5,701,495 A * | 12/1997 | Arndt et al. | 710/263 |
| 5,857,090 A * | 1/1999 | Davis et al. | 703/25 |
| 6,006,301 A * | 12/1999 | Tetrick | 710/260 |
| 6,263,395 B1 * | 7/2001 | Ferguson et al. | 710/262 |
| 6,279,064 B1 * | 8/2001 | Bronson et al. | 710/112 |
| 6,470,408 B1 * | 10/2002 | Morrison et al. | 710/268 |
| 6,920,519 B1 * | 7/2005 | Beukema et al. | 710/306 |
| 6,990,669 B1 * | 1/2006 | Ballantyne | 718/108 |
| 7,003,611 B1 * | 2/2006 | Arndt | 710/260 |
| 7,089,341 B1 * | 8/2006 | Kriegel | 710/266 |

* cited by examiner

*Primary Examiner*—Rehana Perveen
*Assistant Examiner*—Brian Misiura
(74) *Attorney, Agent, or Firm*—Casimer K. Salys; Dillon & Yudell LLP

(57) ABSTRACT

To emulate an interrupt architecture in a data processing system, interrupt emulation code receives from an operating system a first call requesting access to a first resource in a first interrupt architecture. In response to receipt by the interrupt emulation code of the first call, the interrupt emulation code maps the first resource to a second resource in interrupt hardware of the data processing system. The mapping operation includes determining an identifier of the second resource in a different second interrupt architecture. The interrupt emulation code then initiates access to the second resource implemented by the interrupt hardware.

18 Claims, 13 Drawing Sheets

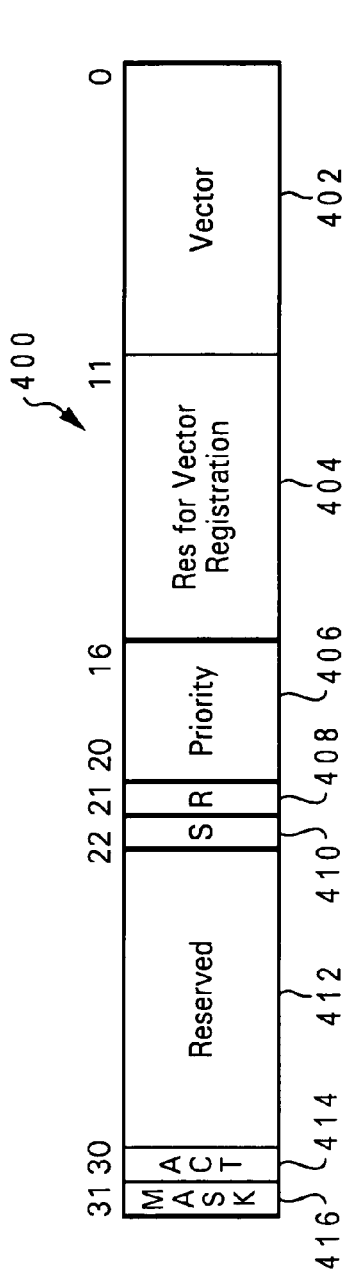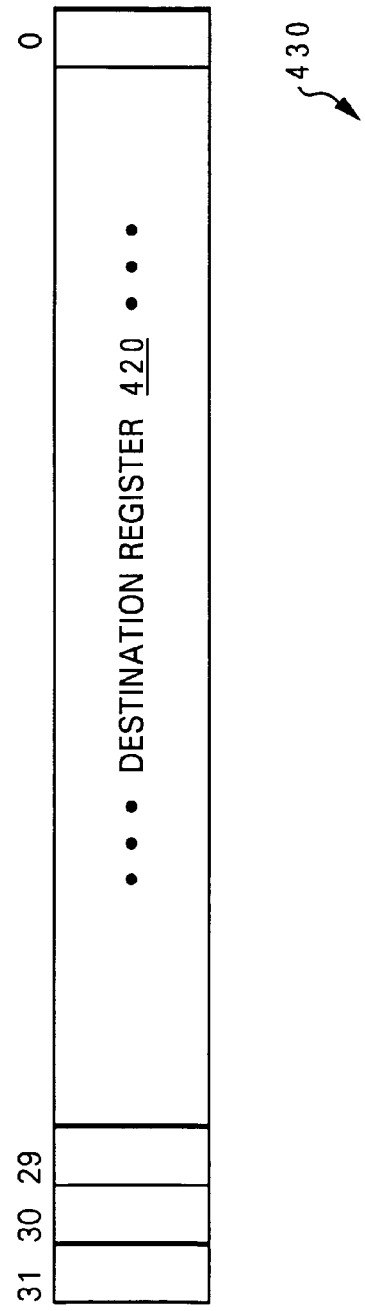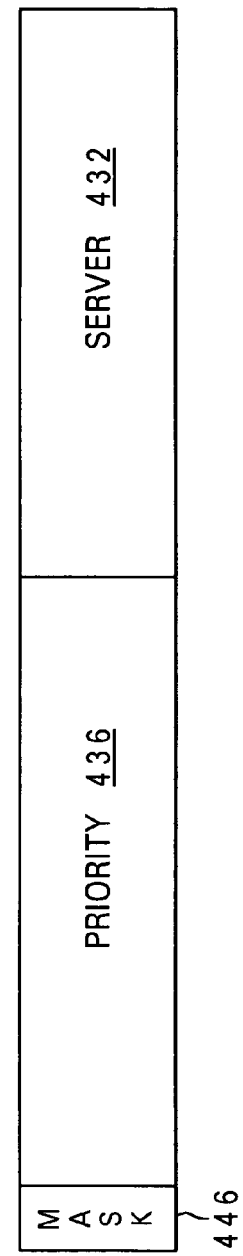
Fig. 4A Prior Art
Fig. 4B Prior Art
Fig. 4C

METHOD, SYSTEM AND PROGRAM PRODUCT FOR EMULATING AN INTERRUPT ARCHITECTURE WITHIN A DATA PROCESSING SYSTEM

BACKGROUND OF THE INVENTION

1. Technical Field

The present invention relates in general to data processing system and, in particular, to methods, systems and program products for interrupt handling in a data processing system. Still more particularly, the present invention relates to methods, systems, and program products for emulating an interrupt architecture in a data processing system.

2. Description of the Related Art

In computer systems, interrupts are often utilized to alert a processor to the occurrence of an event that requires special handling. Interrupts may be utilized, for example, to request service from a recipient processor, report an error condition or receipt of data, or simply communicate information between devices.

In conventional multiprocessor (MP) computer systems, interrupts have been handled in a variety of ways, utilizing hardware and/or software mechanisms. Conventional MP computer systems may employ a global interrupt controller that selects a processor to service an external or inter-processor interrupt based, for example, upon the priority of the interrupt and the priority of the process, if any, being executed by each processor. In order to facilitate efficient handling of interrupt-related communication, the global interrupt controller and the processors communicate interrupt requests, end-of-interrupt (EOI) messages, processor priorities and other interrupt-related information utilizing specific hardware registers and/or predefined memory address offsets.

One difficulty with implementing an interrupt scheme in a data processing system is that the various hardware and software components that a designer may desire to include within the data processing system may not all be compliant with a single interrupt standard, such as the non-proprietary OpenPIC (Open Programmable Interrupt Controller) architecture or the proprietary I/O APIC (Input/Output Advanced Programmable Interrupt Controller) architecture developed by Intel Corporation of Santa Clara, Calif. The inconsistencies between the various interrupt architectures in interrupt communication, bit ordering, interrupt priority designations, etc. can create incompatibilities with both interrupt hardware and operating system software.

The present invention appreciates that, despite such apparent incompatibilities, it would be desirable to develop a data processing system from hardware and software components implementing heterogeneous interrupt architectures.

SUMMARY OF THE INVENTION

In view of the foregoing, the present invention provides methods, systems and program products for emulating an interrupt architecture in a data processing system.

According to at least one embodiment, to emulate an interrupt architecture in a data processing system, interrupt emulation code receives from an operating system a first call requesting access to a first resource in a first interrupt architecture. In response to receipt by the interrupt emulation code of the first call, the interrupt emulation code maps the first resource to a second resource in interrupt hardware of the data processing system. The mapping operation includes determining an identifier of the second resource in a different second interrupt architecture. The interrupt emulation code then initiates access to the second resource implemented by the interrupt hardware.

All objects, features, and advantages of the present invention will become apparent in the following detailed written description.

BRIEF DESCRIPTION OF THE DRAWINGS

The novel features believed characteristic of the invention are set forth in the appended claims. However, the invention, as well as a preferred mode of use, will best be understood by reference to the following detailed description of an illustrative embodiment when read in conjunction with the accompanying drawings, wherein:

FIGS. 4A and 4B respectively illustrate Vector Priority and Destination registers in an interrupt source unit in accordance with the conventional OpenPIC interrupt architecture;

FIG. 4C depicts a shadow mask bit, priority value and server value utilized to emulate an interrupt architecture in accordance with an embodiment of the present invention;

DETAILED DESCRIPTION OF ILLUSTRATIVE EMBODIMENT

Figure 1:
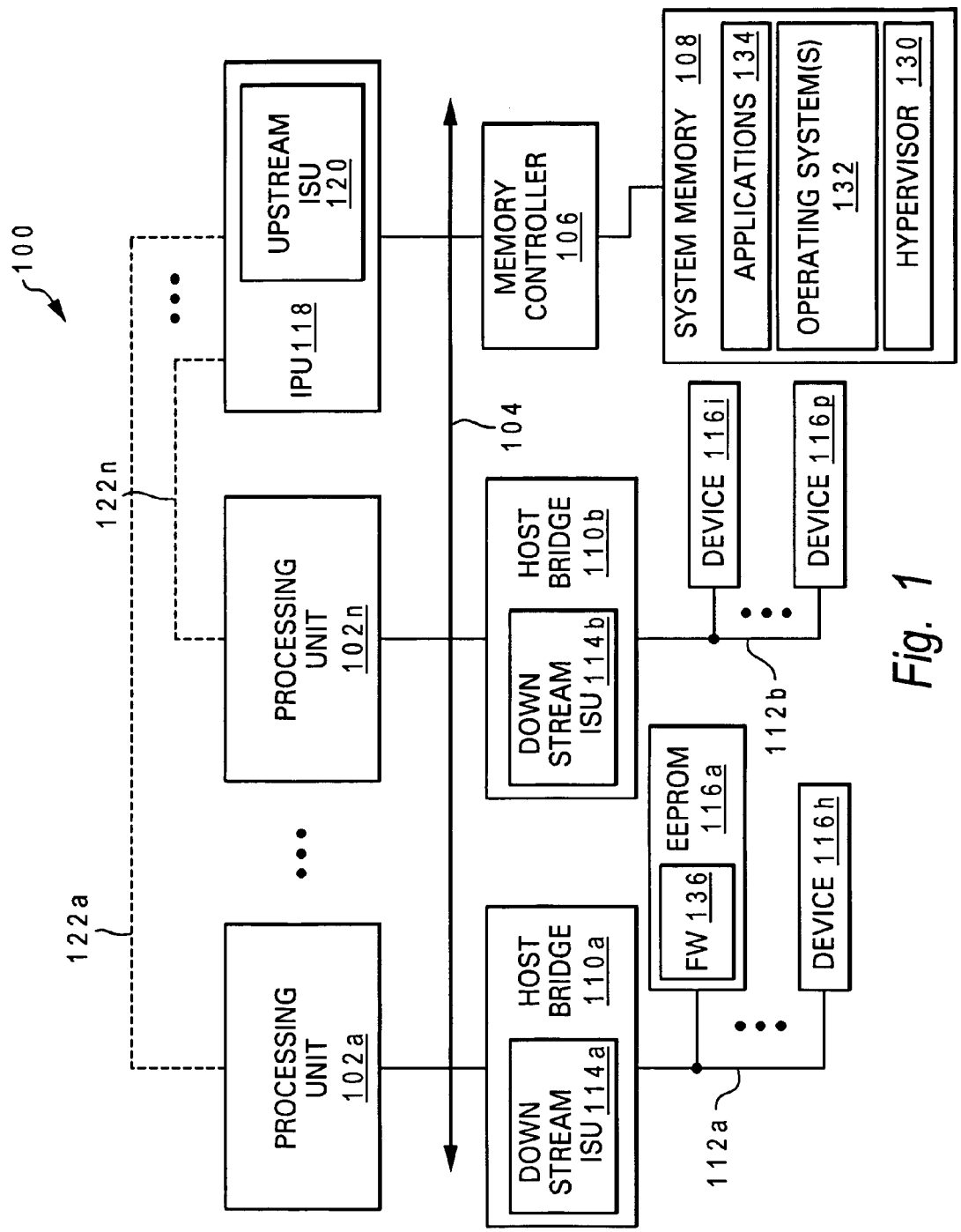
FIG. 1 is a high level block diagram of a data processing system in which the present invention may advantageously be employed.

With reference to the figures and in particular with reference to FIG. 1, there is illustrated a high level block diagram of an exemplary data processing system 100 in which the present invention may advantageously be implemented. As shown, data processing system 100 is a multi-processor data processing system including multiple processing units 102a–102n for processing data and instructions. In accordance with a preferred embodiment of the present invention, processing units 102 implement a Reduced Instruction Set Computer (RISC) hardware architecture, such as the POWER architecture developed by IBM Corporation of Armonk, N.Y. In alternative embodiments of the present invention, a Complex Instruction Set Computer (CISC) hardware architecture may be utilized.

Processing units 102 are coupled for communication to a system interconnect 104, which may include one or more buses and/or switches for conveying address, data and control information between attached devices. In the depicted embodiment, the attached devices include a memory controller 106 providing an interface to a system memory 108 and one or more host bridges 110a, 10b, each providing an interface to a respective mezzanine bus 112a, 112b. For example, in one embodiment, each mezzanine bus 112 is a Peripheral Component Interconnect (PCI) bus, and each host bridge 110 is a PCI host bridge. As further shown in FIG. 1, mezzanine buses 112a, 112b in turn provides slots for the attachment of additional devices 116a–h and 116i–116p, respectively, which may include network interface cards, I/O adapters, non-volatile storage device adapters, additional bus bridges, etc. During operation of data processing system 100, various of these devices 116 may asynchronously assert interrupts to the associated host bridge 110 (via unillustrated interrupt lines) in order to request service of some type. These external interrupt requests (so called because they are generated external to processing units 102) are initially managed by downstream interrupt source units (ISUs) 114a, 114b in host bridges 110a, 110b.

The devices coupled to system interconnect 104 further include an interrupt presentation unit (IPU) 118 that receives and presents to processing units 102a–102n for handling interrupts generated by processing units 102 (i.e., inter-processor interrupts (IPIs)) and external interrupts received from downstream ISUs 114. Interrupt presentation unit 118, which may be implemented with a processing unit 102 executing interrupt presentation software and/or special purpose interrupt hardware, may communicate an interrupt to one or more processing units 102 via system interconnect 104, or alternatively, via one of dedicated interrupt lines 122a–122n. As shown, IPU 118 includes an upstream ISU 120 interfacing IPU 118 to downstream ISUs 114 and providing any necessary translation between the interrupt architecture(s) implemented by host bridges 110 and the interrupt architecture implemented by IPU 118.

During operation of data processing system 100, processing units 102 execute various instructions from system memory 108 and Electrically Erasable Programmable Read-Only Memory (EEPROM) 116a in order to perform desired tasks. These instructions include firmware 136, applications 134, one or more instances of one or more operating systems 132, and a hypervisor (operating system supervisor) 130 that creates, manages and dispatches instances of operating systems 132 for execution. As discussed further below, firmware 136 and hypervisor 130 include instructions for emulating a selected interrupt architecture independently of the actual underlying hardware interrupt architecture(s) implemented by IPU 114, host bridges 110, and devices 116.

Figure 2:
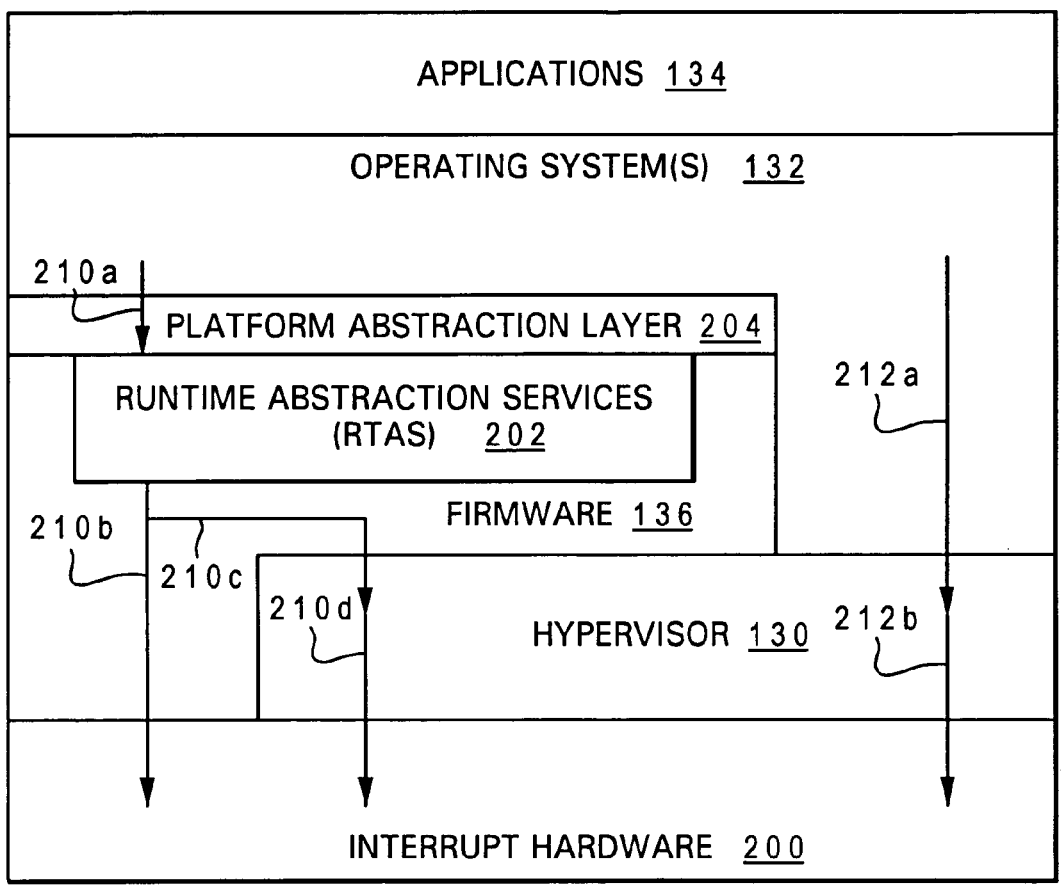
FIG. 2 is a layer diagram depicting the use of interrupt emulation software, such as firmware and/or an operating system supervisor (Hypervisor), to emulate an interrupt architecture in a data processing system in accordance with the present invention.

Referring now to FIG. 2, a layer diagram representing an exemplary software environment of data processing system 100 is depicted in relation to the underlying interrupt hardware 200. In data processing system 100 of FIG. 1, interrupt hardware 200 includes at least interrupt presentation unit 118, host bridges 110 and devices 116.

As depicted in FIG. 2, applications 134 execute at a highest logical layer under control of and utilizing the resources provided by one or more underlying operating system instances 132. In contrast to conventional implementations in which the operating systems directly communicate with interrupt hardware via well defined interrupt register interfaces, operating systems 132 communicate with interrupt hardware 200 via interrupt emulation code, which includes firmware 136 and hypervisor 130 in a preferred embodiment. That is, interrupt-related calls by operating systems 132, which presume the existence of the emulated interrupt architecture, are received by RunTime Abstraction Services (RTAS) 202 within firmware 136 or hypervisor 130. RTAS 202 and hypervisor 130, which are aware of at least the interrupt architecture of the immediately underlying interrupt hardware 200, translate the interrupt-related calls into the appropriate form for interrupt hardware 200.

For example, in response to receipt of call 210a, RTAS 202 translates an operating system call 210a of the emulated interrupt architecture into a different call 210b of the immediately underlying hardware interrupt architecture and transmits call 210b to interrupt hardware 200. Alternatively or additionally, RTAS 202 may translate call 210a into an intermediate call 210c that is further translated by hypervisor 130 into a call 210d of the immediately underlying hardware interrupt architecture. Hypervisor 130 may similarly translate a call 212a in the emulated interrupt architecture received directly from an operating system 132 into a different call 212b in the immediately underlying hardware interrupt architecture and transmit call 212b to the underlying interrupt hardware 200.

In one preferred embodiment, operating system interrupt calls are handled by either RTAS 202 or hypervisor 130 depending upon the intended target of the interrupt call. For example, interrupt calls pertaining to external interrupt sources are received and translated by RTAS 202, and interrupt calls directed to interrupt presentation unit 118 are received and translated by hypervisor 130. It will further be appreciated that responses to such calls, if any, also require appropriate translation.

Although not required to implement the present invention, firmware 136 or OS(s) 132 may optionally further include a platform abstraction layer (PAL) 204. PAL 204 further "abstracts" the hardware resources from the software, creating independence between operating system calls, such as call 210*a*, and the processing unit(s) 102 or other hardware resources actually utilized to service such calls.

In accordance with the present invention, the interrupt architecture implemented by operating systems 132 is independent of the underlying interrupt architecture implemented by IPU 118, which is in turn independent of the underlying interrupt architecture implemented by host bridges 110. Thus, in order for asynchronous interrupts within data processing system 100 to be handled correctly, two or more levels of emulation or translation may be required: (1) translation between the interrupt architectures of host bridges 110 and IPU 118 and (2) translation between the interrupt architecture(s) of IPU 118 and operating system(s) 132.

To promote better understanding of the present invention, the present invention is described hereinafter with reference to a specific embodiment in which the PowerPC interrupt architecture (a RISC Platform Architecture (RPA)-compliant interrupt architecture that is compatible with the AIX and Linux operating systems) is emulated over an IPU 118 implementing the OpenPIC interrupt architecture and host bridges implementing the Intel® I/O APIC interrupt architecture. The PowerPC interrupt architecture is described in detail in U.S. Pat. No. 5,701,495, which is commonly assigned with the present application and incorporated herein by reference in its entirety. The I/O APIC interrupt architecture is described in Intel® 82093AA I/O Advanced Programmable Interrupt Controller (I/O APIC) Datasheet, available from Intel Corporation of Santa Clara, Calif.

Figure 3:
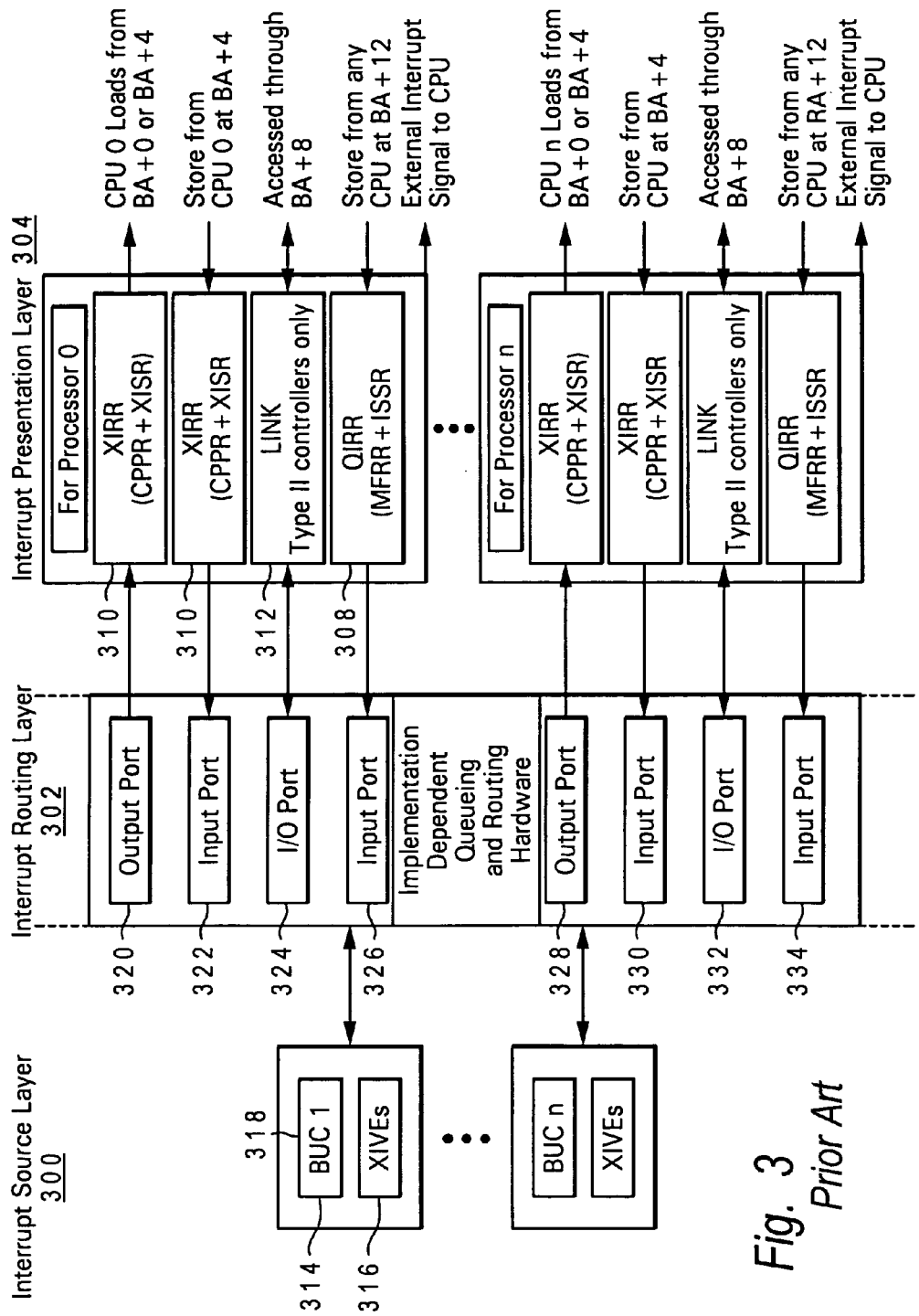
FIG. 3 is a logical view of the prior art PowerPC interrupt architecture.

As an introduction to the PowerPC interrupt architecture, reference is now made to FIG. 3, which illustrates the logical implementation of the PowerPC interrupt architecture utilizing three layers: the interrupt source layer 300, interrupt routing layer 302, and interrupt presentation layer 304. Interrupt source layer 300 includes the various interrupt sources 314 that may assert interrupts (i.e., signals indicating the presence of an interrupt condition at an interrupt source 314) to request service. Interrupt source layer 300 identifies the interrupt source and assigns its priority and server number. Interrupt routing layer 302 routes all interrupt conditions to the appropriate instance of an interrupt management area within interrupt presentation layer 304. Interrupt presentation layer 304 communicates the interrupt source to software, which accepts the interrupt condition, indicates acceptance of the interrupt, notifies the interrupt presentation layer 304 that it has processed the interrupt, and resets the interrupt condition.

As depicted, each interrupt source 314 includes one eXternal Interrupt Vector Entry (XIVE) 316 for each supported interrupt source line. An external interrupt source 314 signals the existence of an interrupt request for the corresponding interrupt source through the associated XIVE 316. XIVE 316 is a 4-byte register, with the high order two bytes (bits 0–15) reserved, the next to the low order byte (bits 16–23) specifying the PowerPC interrupt server number, and the low order byte (bits 24–31) specifying the interrupt priority. In the server number byte, low values are used to designate individual processing units, and high values are utilized to designate global servers (i.e., groups of processing units). In the interrupt priority byte, the least favored interrupt priority (0xFF) functions as a disable for the interrupt source, and 0x00 is reserved for special interrupt sources. In addition to these special priority values, AIX utilizes only values 0x01 through 0x04, and Linux utilizes only value 0x05.

Interrupt presentation layer 304 comprises registers (in accordance with the present invention, emulated registers) associated with processors or servers (i.e., logical groups of processors for interrupt handling) to which the operating system(s) interface to create and handle individual interrupts. In the PowerPC interrupt architecture, the definition of interrupt presentation layer 304 varies according to the number of processors or servers within a system and includes the following registers:

(1) Queued Interrupt Request Register (QIRR) 308—at least one per processor plus one per non-processor-specific server queue consisting of two registers:
   (a) Most Favored Request Register (MFRR)—an 8-bit register holding the priority of the most favored inter-processor queued for a particular processor; and
   (b) Interrupt Source Specification Register (ISSR) used to configure the source specification of the MFRR.
(2) eXternal Interrupt Request Register (XIRR) 310—implemented per processor to provide a single source identifier to the system software for interrupts and consisting of two registers:
   (a) Current Processor Priority Register (CPPR)—an 8-bit register indicating the current processor priority with one of 256 priorities values. The least favored priority is x0FF and the most favored is x00. The interrupt presentation layer only signals the associated processor with interrupt conditions that are more favored than the current setting of the CPPR; and
   (b) eXternal Interrupt Source Register (XISR)—a 24-bit register containing the system wide unique identifier of the interrupt source that signaled. The low order 4 bits indicate one of 16 interrupt levels, or sources (SRC) within a Bus Unit Controller (BUC) 318. The high order 20 bits represent the Bus Unit ID (BUID) for a Bus Unit Controller (a single physical BUC may support more than 16 levels by reporting itself as multiple sequential BUIDs). A value of 0 indicates that there are no current external interrupts pending, and a value of 2 indicates that the MFRR contains a more favored level than the CPPR.
(3) LINK register 312—a register found only in Type II interrupt presentation controllers and used to form a circular linked list of per-processing-unit interrupt presentation controllers that comprise the group servicing a server queue. The circular linked list replaces the corresponding functionality of the interrupt routing layer in type I interrupt presentation controllers.

Each of these registers within interrupt presentation layer 304 logically has a respective associated input and/or output port 320–334 within interrupt routing layer 302 to enable communication to and from interrupt source layer 300.

In a conventional PowerPC interrupt architecture, interrupt presentation layer 304 is embodied through a memory mapped Interrupt Management Area (IMA) for each processing unit, as shown below in Table 1. The starting address of the processing unit's IMA is referred to as its Base Address (BA) and is different for each processing unit. The BA for each processing unit is setup at configuration time and has structure set forth below in Table I.

TABLE I

| Address | Byte 0 | Byte 1 | Byte 2 | Byte 3 | Comments |
|---|---|---|---|---|---|
| BA + 0 | CPPR | XISR | XISR | XISR | XIRR without side effects |
| BA + 4 | CPPR | XISR | XISR | XISR | XIRR with Load/Store side effects |
| BA + 8 | Reserved | LINK | LINK | LINK | Group server queue link register for type II interrupt presentation controllers. |
| BA + 12 | MFRR | Reserved | Reserved | Reserved | If not 0xFF, then the MFRR indicates the priority of the most favored IPI for this CPU. AIX signals IPIs with the value 0x00, and Linux signals IPIs with a kernel-specific value (e.g., 0x04). |

The OpenPIC interrupt architecture, while having some similarities to the PowerPC interrupt architecture, employs a different IMA for the interrupt presentation layer. In particular, the OpenPIC architecture employs the data structure set forth in Table II.

TABLE II

| Address | Byte 0 | Byte 1 | Byte 2 | Byte 3 | Comments |
|---|---|---|---|---|---|
| BA + 0x040 | Inter-Processor Interrupt (IPI) 0 command port | | | Dispatch | 32-bit vector identifying with each set bit the processor(s) receiving the IPI |
| BA + 0x050 | IPI 1 Dispatch command port | | | | same |
| BA + 0x060 | IPI 2 Dispatch command port | | | | same |
| BA + 0x070 | IPI 3 Dispatch command port | | | | same |
| BA + 0x080 | Reserved | | | CTPR | Current Task Priority Register - low order 4 bits indicate the current task priority of the processing unit |
| BA + 0x0A0 | Reserved | | | IAR | Interrupt Acknowledge Register - low order 10 bits indicate vector of the highest priority interrupt pending for this CPU |
| BA + 0xB0 | End of Interrupt (EOI) | | | | Writing a zero signals the end of processing for the highest priority interrupt currently in progress for the associated processor. Values other than zero are currently undefined. |

As can be seen by comparison of Tables I and II, there is some functional correspondence between the registers of the PowerPC and OpenPIC interrupt architectures. For example, the four OpenPIC IPI dispatch command ports correspond in function to the single PowerPC MFRR, the OpenPIC CTPR corresponds to the PowerPC CPPR, the OpenPIC IAR corresponds to the PowerPC XISR, and the OpenPIC EOI register corresponds to a write to the PowerPC XIRR.

However, there are also several differences that complicate mapping between the different interrupt architectures. For example, the OpenPIC interrupt architecture defines 4 IPI registers per processor, which can each be set to deliver an IPI at a different priority. The PowerPC interrupt architecture, on the other hand, implements only one MFRR per processor. Since both AIX and Linux, two operating systems of interest, only deliver IPIs at only one priority, only one IPI register is used. However, to comply with the OpenPIC interrupt architecture, all four IPI registers appear in the IMA for each processor, but their contents are logically ORed and software is constrained to set only one register (e.g., at BA+0x040). In addition, it is important to note that in the OpenPIC interrupt architecture, IPIs do not require an explicit EOI call because acknowledging the interrupt is deemed to imply an EOI call. In the PowerPC interrupt architecture, however, all interrupts including IPIs must received an EOI call; thus, in emulating the PowerPC interrupt architecture over the OpenPIC interrupt architecture, EOI calls for IPIs (identified by an XISR value of 0x02) are ignored.

Another distinction between the OpenPIC and PowerPC interrupt architectures that must be managed to emulate the PowerPC interrupt architecture is the absence of a true polling function for external interrupts in the OpenPIC interrupt architecture. That is, as noted above in Table I, a read to BA+0 in the PowerPC interrupt architecture permits a non-destructive read of the XIRR that does not acknowledge the interrupt (interrupts are acknowledged through a destructive read of BA+4). The OpenPIC interrupt architecture does not define a poll of an interrupt register.

In view of the above-described corresponding and distinct features of the PowerPC and OpenPIC interrupt architectures, the present invention introduces a number of interrupt presentation layer routines implemented by hypervisor 130 to emulate the PowerPC interrupt architecture over an OpenPIC interrupt presentation layer implementation. These interrupt presentation layer routines are summarized in Table III and described in detail below.

TABLE III

| Hypervisor interrupt presentation layer routines | Meaning | PPC interrupt architecture call | OpenPIC interrupt architecture call |
|---|---|---|---|
| H_EOI | Issue an End-of-Interrupt (EOI) | write BA + 4 | write BA + 0xB0 with value(0) |
| H_CPPR | Write the Current Processor Priority Register (CPPR) | write BA + 4 | write BA + 0x80 (Current Task Priority Register (CTPR)) |
| H_IPI | Generate an Inter-Processor Interrupt (IPI) | write BA + C | write BA + 0x40 (or 0x50, 0x60, 0x70) |
| H_IPOLL | Poll the xirr register (non-destructive read) | read BA + 0 | — |
| H_XIRR | Read the xirr register | read BA + 4 | read BA + 0xA0 (Interrupt Acknowledge Register(IAR)) - if the interrupting source is an IPI, a value of 0x02 is returned |

As noted above, emulation of the PowerPC interrupt architecture over an OpenPIC-compliant IPU 118 also entails translation of interrupt source layer calls, which translation is performed by RTAS 202 in one preferred embodiment of the present invention. Upstream ISU 120 of IPU 118 implements two OpenPIC-defined registers per external interrupt source: a vector priority register (VecPri) and a destination register (Dest). In general, these per-interrupt-source register pairs correspond to IOAPIC interrupt source register pairs within downstream ISU 114. The necessary translation between the different formats of the OpenPIC and IOAPIC interrupt source register pairs is handled by upstream ISU 120.

As depicted in FIG. 4A, an OpenPIC VecPri register 400 includes a vector field 402 identifying an external interrupt source, reserved fields 404, 408 and 412, a priority field 406 indicating a priority of this interrupt source, a sense field 410 indicating whether an interrupt signal is positive edge triggered ('0') or active low level triggered ('1'), an Activity Bit (ACT) 414 indicating whether the vector, priority, and destination information for this source are currently in use by the interrupt controller and therefore should not be changed, and a MASK bit 416 that, when set, disables any further interrupts from this source.

In a preferred embodiment, interrupt emulation code (e.g., hypervisor 130 and firmware 136) maintains in memory shadow VecPri "register" 430 of FIG. 4C corresponding to VecPri register 400. As shown, shadow VecPri register 430 includes a priority field 436 and mask bit 446 corresponding to previously described fields 406 and 416. In addition, shadow VecPri register 430 also includes a server field 432 that is used to determine how to set the VecPri register's associated Destination register described below with respect to FIG. 4B.

As shown in FIG. 4B, the OpenPIC destination (Dest) register is a 32-bit vector that specifies the destination(s) for the interrupt utilizing one bit per destination. If a single destination is selected, then interrupts from the associated interrupt source will be directed to that destination. If multiple destinations are selected, then interrupts from the interrupt source will be distributed among the selected destination processors utilizing an implementation-specific distribution algorithm.

In order to emulate the XIVEs of the PowerPC interrupt architecture over the OpenPIC VecPri and Dest registers, RTAS 202 supports a number of different routines to translate accesses to the XIVEs into VecPri and Dest access. These routines are summarized in Table IV below:

TABLE IV

| Interrupt source layer call | Meaning |
|---|---|
| get_XIVE | read the value of the XIVE |
| set_XIVE | write the value of the XIVE |
| int_off | disable an interrupt source |
| int_on | enable an interrupt source |

As described in detail below, the present invention support different embodiments of the foregoing routines depending upon whether or not the interrupt hardware implements a hardware mask bit 416 for each external interrupt source as shown in FIG. 4A.

Figure 5A:
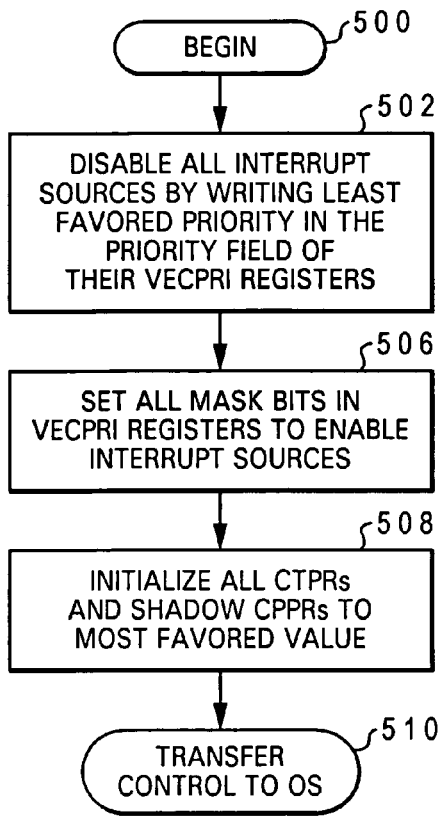
FIG. 5A a high level logical flowchart of an exemplary process for initializing an emulated interrupt architecture at system startup or reset in an embodiment of the present invention including a hardware mask bit.

With reference now to FIG. 5A, there is depicted a high level logical flowchart of a portion of a boot process by which firmware 136 initializes interrupt handling in an emulated interrupt environment in a first embodiment of data processing system 100 that includes hardware mask bits. As illustrated, the process begins (or continues from earlier processing) at block 500 and thereafter proceeds to block 502, which depicts firmware 136 disabling all external interrupt sources by writing the priority field 406 of each OpenPIC VecPri register 400 in IPU 118 to the least favored value.

In disabling the external interrupt sources as shown in block 502, it is important to note that, for both IPIs and external interrupts, the PowerPC and OpenPIC interrupt architectures employ different priority value sizes and meanings. The mappings between the PowerPC and OpenPIC priority values for both IPIs and external interrupts are summarized below in Table V.

TABLE V

| PowerPC | OpenPIC | Meaning |
|---|---|---|
| 0xFF | 0x0 | least favored priority |
| 0x0B | 0x4 | — |
| 0x05 | 0xA | — |
| 0x04 | 0xB | — |
| 0x03 | 0xC | — |
| 0x02 | 0xD | — |
| 0x01 | 0xE | — |
| 0x00 | 0xF | most favored priority |

Following block 502, the process proceeds to block 506, which depicts firmware 136 resetting the MASK bit 416 in each VecPri register 400 to enable interruption by the external interrupt sources. In addition, at block 508, firmware 136 initializes the OpenPIC CTPR of each processing unit 102 in IPU 118 to the most favored value (0xF). Thereafter, at block 510, firmware 136 transfers control to an instance of an operating system 132 to continue the boot process.

At this point in the boot process, interrupts are unmasked (enabled), but the operating system instance 132 is protected from interrupts until it lowers at least one processor priority from the most favored priority value and raises the priority of at least one interrupt source from the least favored priority. In this manner, the operating system instance 132 can hold off interruptions until it is ready and able to handle interrupts appropriately.

Figure 5B:
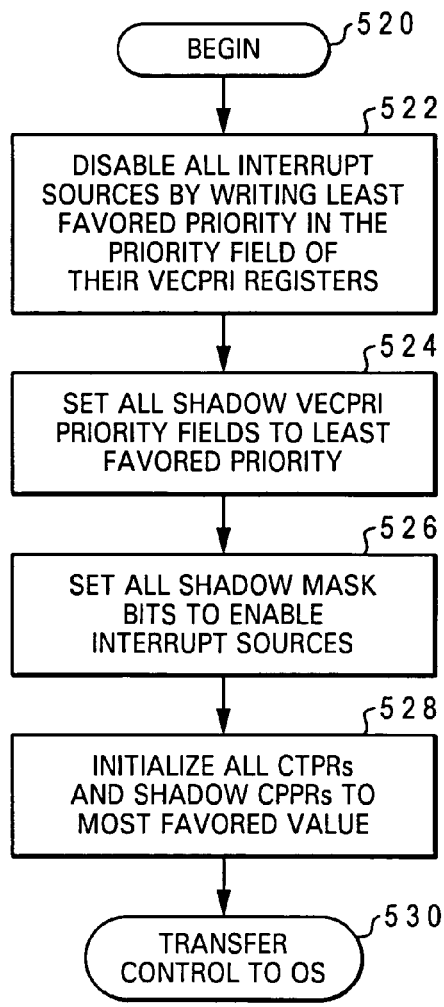
FIG. 5B a high level logical flowchart of an exemplary process for initializing an emulated interrupt architecture at system startup or reset in an embodiment of the present invention that does not include a hardware mask bit.

Referring now to FIG. 5B, there is depicted a high level logical flowchart of a portion of a boot process by which firmware 136 initializes interrupt handling in an emulated interrupt environment in a second embodiment of data processing system 100 that does not includes hardware mask bits. As illustrated, the process begins (or continues from earlier processing) at block 520 and thereafter proceeds to block 522, which depicts firmware 136 disabling all external interrupt sources by writing the priority field 406 of each OpenPIC VecPri register 400 in IPU 118 to the least favored value.

Following block 522, the process proceeds to block 524, which illustrates firmware 136 also setting priority field 436 in the shadow OpenPIC VecPri register 430 of each interrupt source to the least favored priority. Next, the process passes to block 526, which depicts firmware 136 resetting the MASK bit 446 in each shadow OpenPIC VecPri register 430 to enable interruption by the external interrupt sources. In addition, at block 528, firmware 136 initializes the OpenPIC CTPR of each processing unit 102 in IPU 118 and the corresponding emulated CPPRs to the most favored value (0xF). Thereafter, at block 530, firmware 136 transfers control to an instance of an operating system 132 to continue the boot process.

Figure 6A:
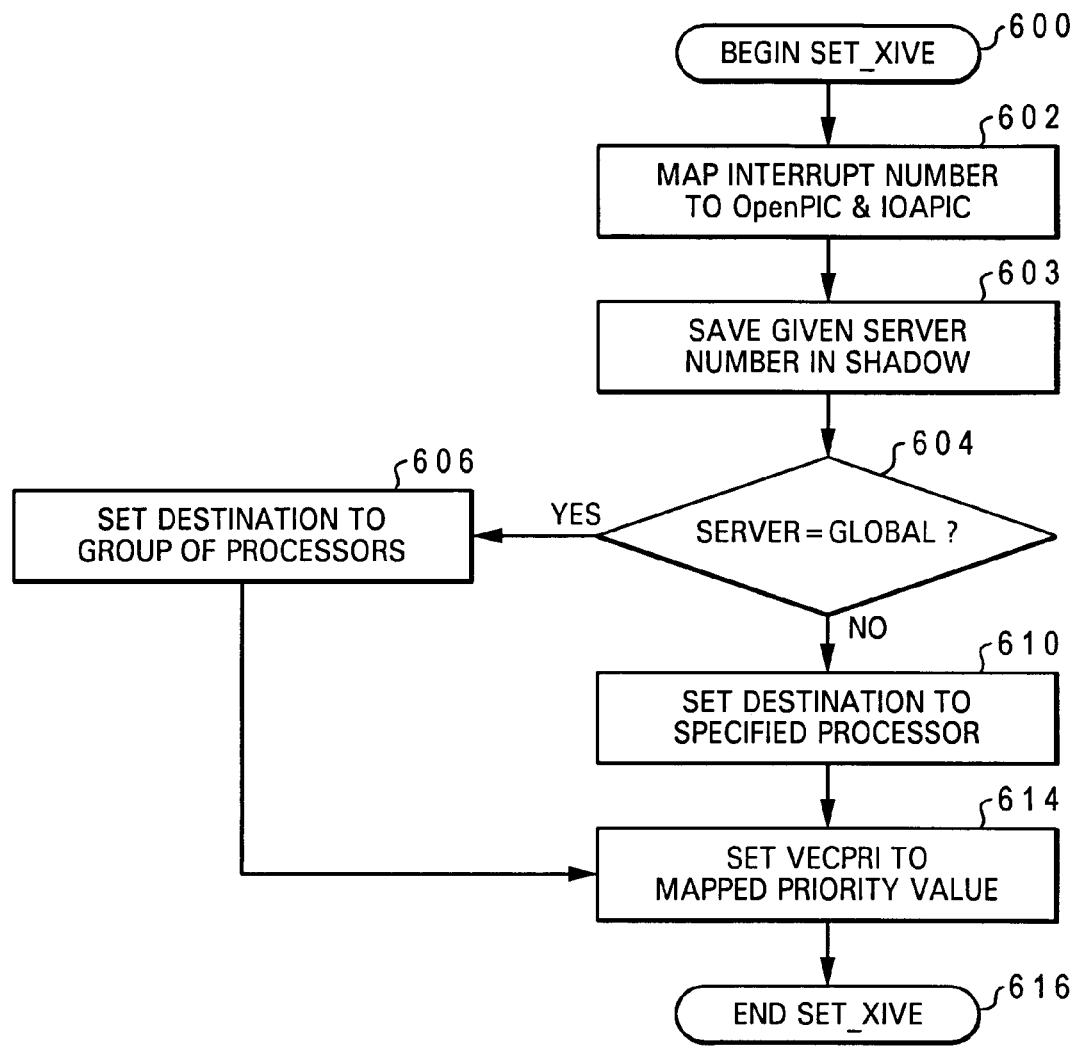
FIG. 6A is a high level logical flowchart of an exemplary process for setting an emulated external interrupt vector entry (XIVE) in an embodiment of the present invention including a hardware mask bit.

Referring now FIG. 6A, there is depicted a high level logical flowchart of an exemplary process for setting an emulated external interrupt vector entry (XIVE) in accordance with a first embodiment of the present invention implementing hardware MASK bits 416. The illustrated process may be performed, for example, to enable interrupts by an external interrupt source in response to a device driver registering with an operating system instance 132.

As shown, the process begins at block 600 in response to firmware 136 receiving from an operating system instance 132 a set_XIVE call specifying, within the emulated interrupt architecture employed by operating system instance 132, an interrupt source identifier, a desired server to service interrupts from the source, and an interrupt priority. As described above, in the PowerPC interrupt architecture assumed by the operating system instance 132, the interrupt source is uniquely identified within data processing system 100 by a BUID/SRC pair. In response to receipt of the interrupt source identifier, firmware 136 maps the PowerPC interrupt source identifier to the corresponding OpenPIC and IOAPIC interrupt source identifiers in order to identify the VecPri and Dest registers 400, 420 and corresponding shadow register 430 for the interrupt source, as indicated at block 602.

Next, at block 603, firmware 136 saves the specified server for the interrupt source in shadow server field 432. In addition, as depicted at block 604, firmware 136 determines whether the specified server for the interrupt source is a global server including multiple processing units 102. If so, firmware 136 sets the OpenPIC Dest register 420 for the interrupt source in IPU 118 to specify the indicated set of processing units, as illustrated at block 606. If, on the other hand, the specified server is not a global server, firmware 136 sets the OpenPIC Dest register 420 for the specified interrupt source to identify the indicated processing unit 102, as depicted at block 610.

Following either of blocks 606 or 610, the process proceeds to block 614, which illustrates firmware 136 updating priority field 406 of VecPri register 400 of the interrupt source to an OpenPIC priority value corresponding to the PowerPC value specified in the set_XIVE call. Thereafter, the process ends at block 616.

Figure 6B:
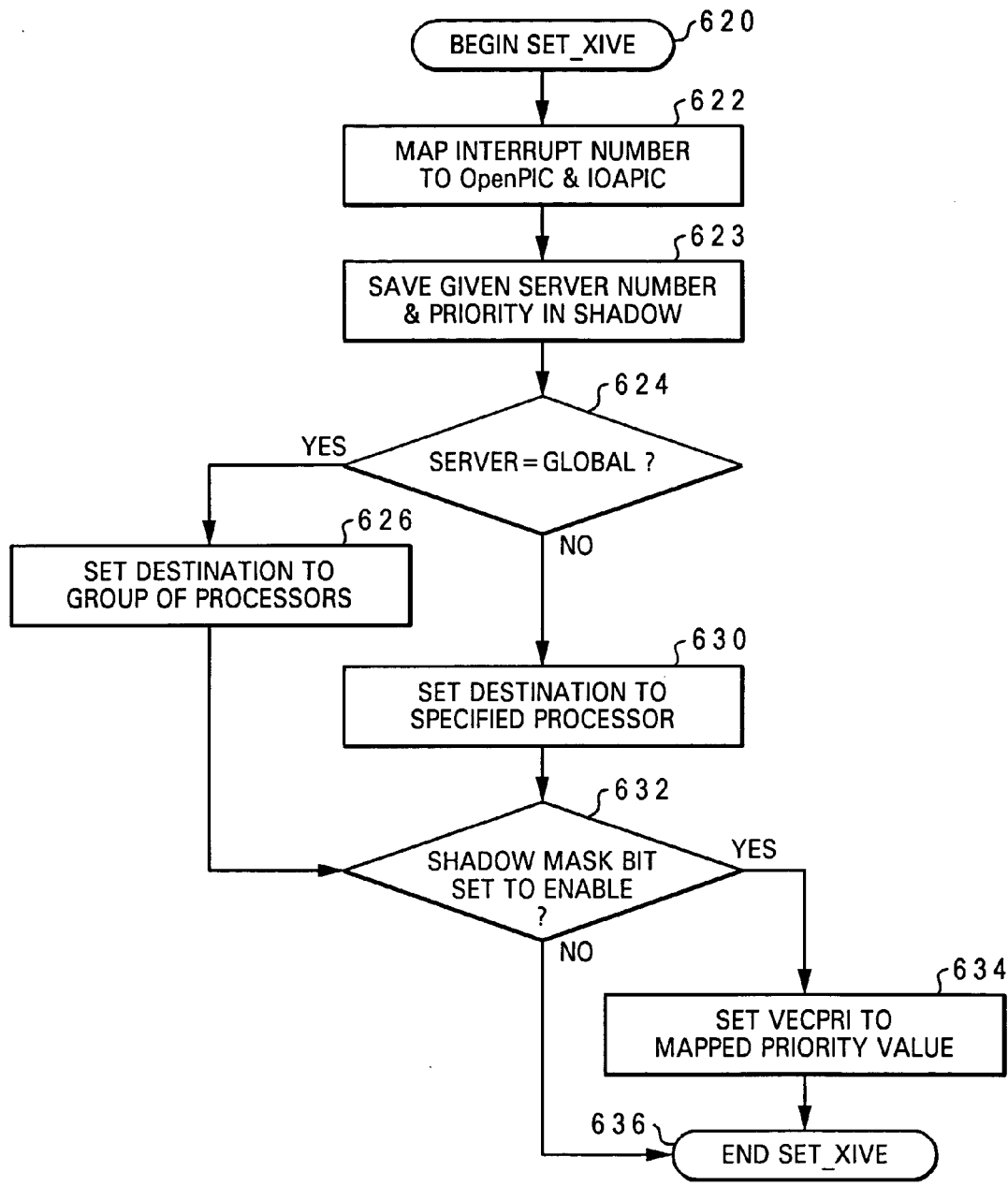
FIG. 6B is a high level logical flowchart of an exemplary process for setting an emulated external interrupt vector entry (XIVE) in an embodiment of the present invention that does not include a hardware mask bit.

With reference now FIG. 6B, there is depicted a high level logical flowchart of an exemplary process for setting an emulated external interrupt vector entry (XIVE) in accordance with a second embodiment of the present invention that does not implement hardware MASK bits 416. As shown, the process begins at block 620 in response to firmware 136 receiving from an operating system instance 132 a set_XIVE call specifying, within the emulated interrupt architecture employed by operating system instance 132, an interrupt source identifier, a desired server to service interrupts from the source, and an interrupt priority. As described above, in the PowerPC interrupt architecture assumed by the operating system instance 132, the interrupt source is uniquely identified within data processing system 100 by a BUID/SRC pair. In response to receipt of the interrupt source identifier, firmware 136 maps the PowerPC interrupt source identifier to the corresponding OpenPIC and IOAPIC interrupt source identifiers in order to identify the VecPri and Dest registers 400, 420 and corresponding shadow register 430 for the interrupt source, as indicated at block 622.

Next, at block 623, firmware 136 saves the specified server and interrupt priority for the interrupt source in shadow server field 432 and shadow priority field 436, respectively. In addition, as depicted at block 624, firmware 136 determines whether the specified server for the interrupt source is a global server including multiple processing units 102. If so, firmware 136 sets the OpenPIC Dest register 420 for the interrupt source in IPU 118 to specify the indicated set of processing units, as illustrated at block 626. If, on the other hand, the specified server is not a global server, firmware 136 sets the OpenPIC Dest register 420 for the specified interrupt source to identify the indicated processing unit 102, as depicted at block 630.

Following either of blocks 626 or 630, the process proceeds to block 632, which illustrates firmware 136 determining whether or not the shadow MASK bit 446 for the interrupt source is set to enable (unmask) interrupts. If not, the process simply terminates at block 636 because interrupts for the interrupt source are masked. If, however, firmware 136 determines at block 632 that the shadow MASK bit 446 is set to enable interrupts, firmware 136 updates priority field 406 of the VecPri register 400 of the interrupt source to an OpenPIC priority value corresponding to the PowerPC value specified in the set_XIVE call. Thereafter, the process ends at block 636.

Figure 6C:
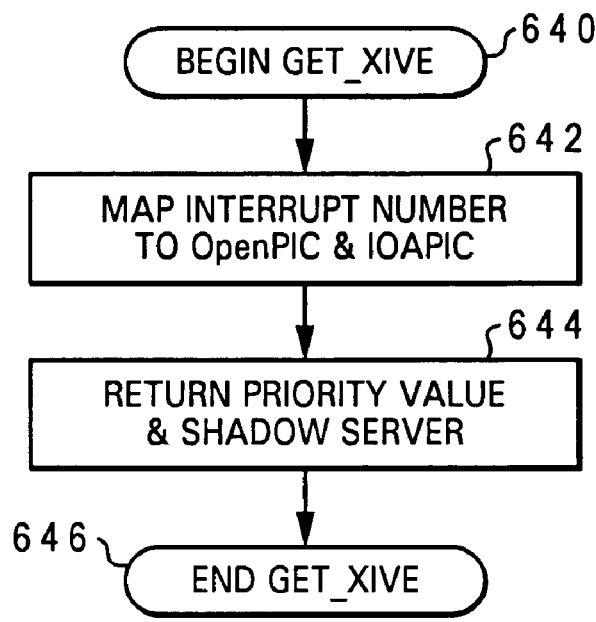
FIG. 6C is a high level logical flowchart of an exemplary process for reading an emulated external interrupt vector entry (XIVE) in an embodiment of the present invention including a hardware mask bit.

With reference now to FIG. 6C, there is illustrated a high level logical flowchart of an exemplary process for reading an emulated external interrupt vector entry (XIVE) in a first embodiment of the present invention in which hardware MASK bits 406 are implemented. The process begins at block 640 in response to firmware 136 receiving from an operating system instance 132 a get_XIVE call requesting the value of the XIVE 316 of a particular interrupt source. As above, the interrupt source is identified in the PowerPC interrupt architecture with a BUID/SRC pair.

In response to receipt of the get_XIVE call, firmware 136 maps the PowerPC interrupt source identifier to the corresponding OpenPIC and IOAPIC interrupt source identifiers in order to identify the VecPri and Dest registers 400, 420 and corresponding shadow registers 430 for the interrupt source, as indicated at block 642. Next, at block 644, firmware 136 returns to operating system instance 132 the value of priority field 406 of the VecPri register 400 for the interrupt source (after appropriate mapping to a PowerPC priority value) concatenated with the associated PowerPC server number obtained from the shadow server field 432. Thereafter, the process terminates at block 626.

Figure 6D:
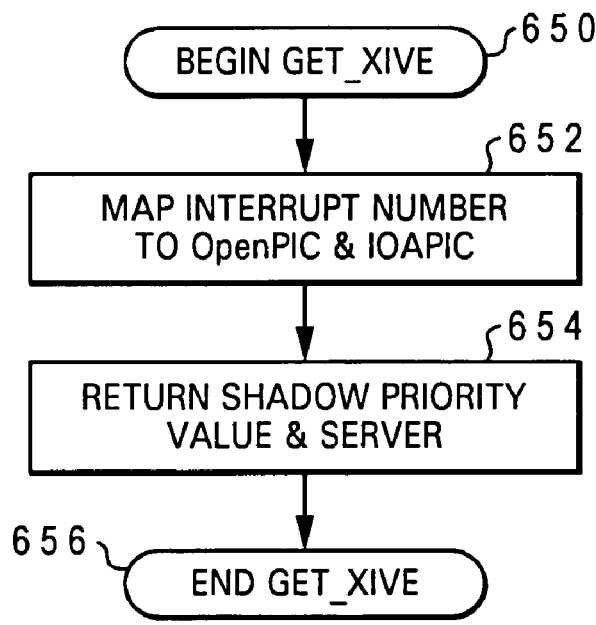
FIG. 6D is a high level logical flowchart of an exemplary process for reading an emulated external interrupt vector entry (XIVE) in an embodiment of the present invention that does not include a hardware mask bit.

With reference now to FIG. 6D, there is depicted a high level logical flowchart of an exemplary process for reading an emulated external interrupt vector entry (XIVE) in a second embodiment of the present invention in which hardware MASK bits 406 are not implemented. As shown, the process begins at block 650 in response to firmware 136 receiving from an operating system instance 132 a get_XIVE call requesting the value of the XIVE 316 of a particular interrupt source. As above, the interrupt source is identified in the PowerPC interrupt architecture with a BUID/SRC pair.

In response to receipt of the get_XIVE call, firmware 136 maps the PowerPC interrupt source identifier to the corresponding OpenPIC and IOAPIC interrupt source identifiers in order to identify the VecPri and Dest registers 400, 420 and corresponding shadow registers 430 for the interrupt source, as indicated at block 652. Next, at block 654, firmware 136 returns to operating system instance 132 the value of shadow priority field 436 for the interrupt source (after appropriate mapping to a PowerPC priority value) concatenated with the associated PowerPC server number obtained from the shadow server field 432. Thereafter, the process terminates at block 656.

Figure 7A:
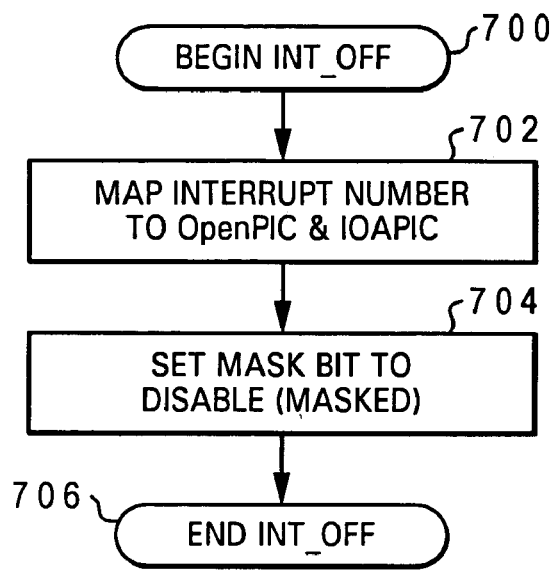
FIG. 7A is a high level logical flowchart of an exemplary process for disabling an external interrupt source in an embodiment of the present invention including a hardware mask bit.

Referring now to FIG. 7A, there is depicted a high level logical flowchart of an exemplary process for disabling an interrupt source in accordance with a first embodiment of the present invention that assumes that upstream ISUs 120 implement physical MASK bits 416 to enable and disable interrupts by interrupt sources. As depicted, the process begins at block 700 in response to receipt by firmware 136 of an int_off call from an operating system instance 132, where the int_off call includes a PowerPC BUID/SRC pair identifying the interrupt source for which interrupts are to be inhibited. The process then proceeds to block 702, which depicts firmware 136 mapping the BUID/SRC pair to OpenPIC and IOAPIC interrupt source identifiers. Next, as shown at block 704, firmware 136 sets the MASK bit 416 of the VecPri register 400 for the identified interrupt source to disable (mask) interrupts. The process thereafter ends at block 706.

Figure 7B:
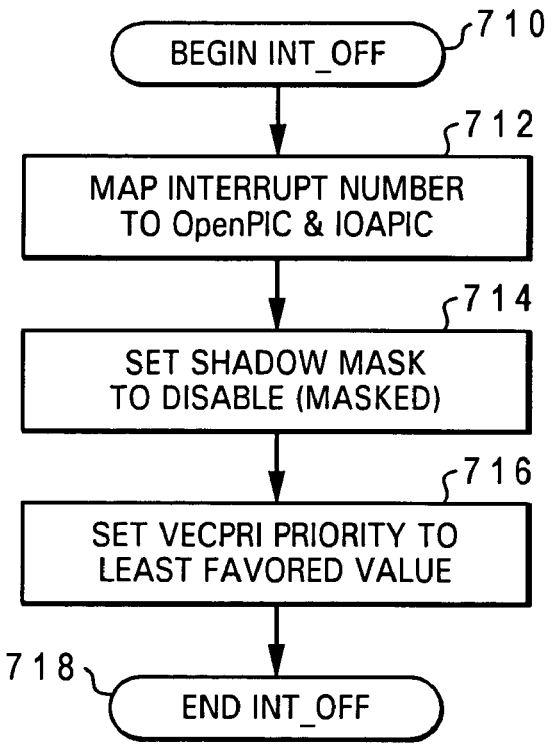
FIG. 7B is a high level logical flowchart of an exemplary process for disabling an external interrupt source in an embodiment of the present invention that does not include a hardware mask bit.

Referring now to FIG. 7B, there is depicted a high level logical flowchart of an exemplary process for disabling an interrupt source in accordance with a second embodiment of the present invention in which upstream ISUs 120 do not implement physical MASK bits to enable and disable interrupts by interrupt sources. As illustrated, the process begins at block 710 in response to receipt by firmware 136 of an int_off call from an operating system instance 132, where the int_off call includes a PowerPC BUID/SRC pair identifying the interrupt source for which interrupts are to be inhibited. The process then proceeds to block 712, which depicts firmware 136 mapping the BUID/SRC pair to OpenPIC and IOAPIC interrupt source identifiers. Next, as shown at blocks 714 and 716, firmware 136 sets the shadow MASK bit 446 of the shadow VecPri register 430 for the identified interrupt source to disable (mask) interrupts and sets the value of priority field 406 of VecPri register 400 to the least favored priority. Thereafter, the process terminates at block 718.

It should be noted that in the process depicted in FIG. 7B two separate mechanisms are utilized to disable interrupts by an interrupt source—shadow MASK bit 446 and the value of priority field 406. Both mechanisms are employed so that interrupts are not inadvertently enabled by a device driver of another interrupt source sharing the same interrupt line setting the value of priority field 406 to a priority other than the least favored priority.

Figure 7C:
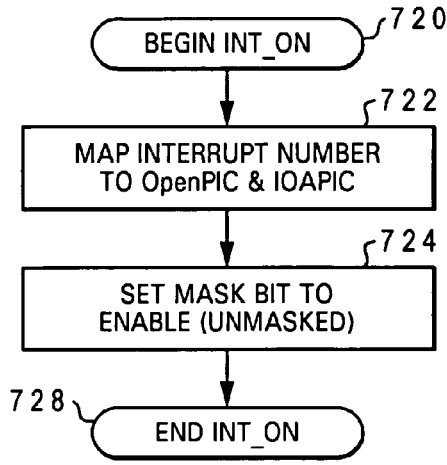
FIG. 7C is a high level logical flowchart of an exemplary process for enabling an external interrupt source in an embodiment of the present invention including a hardware mask bit.

With reference now to FIG. 7C, there is depicted a high level logical flowchart of an exemplary process for enabling interrupts by an external interrupt source in accordance with a first embodiment of the present invention in which upstream ISUs 120 implement physical MASK bits 416 to enable and disable interrupts by interrupt sources.

As depicted, the process of FIG. 7C begins at block 720 in response to receipt by firmware 136 of an int_on call from an operating system instance 132, where the int_on call includes a PowerPC BUID/SRC pair identifying the interrupt source for which interrupts are to be inhibited. The process then proceeds to block 722, which depicts firmware 136 mapping the BUID/SRC pair to corresponding OpenPIC and IOAPIC interrupt source identifiers. Next, as shown at block 724, firmware 136 resets the MASK bit 416 of the VecPri register 400 for the identified interrupt source to enable (unmask) interrupts. Thereafter, the process terminates at block 728.

Figure 7D:
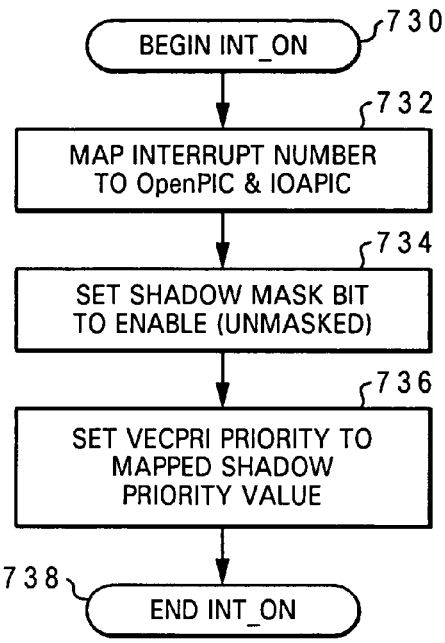
FIG. 7D is a high level logical flowchart of an exemplary process for enabling an external interrupt source in an embodiment of the present invention that does not include a hardware mask bit.

Referring now to FIG. 7D, there is illustrated a high level logical flowchart of an exemplary process for enabling interrupts by an external interrupt source in accordance with a second embodiment of the present invention in which upstream ISUs 120 do not implement physical MASK bits 416 to enable and disable interrupts by interrupt sources.

As shown, the process of FIG. 7D begins at block 730 in response to receipt by firmware 136 of an int_on call from an operating system instance 132, where the int_on call includes a PowerPC BUID/SRC pair identifying the interrupt source for which interrupts are to be inhibited. The process then proceeds to block 732, which depicts firmware 136 mapping the BUID/SRC pair to corresponding OpenPIC and IOAPIC interrupt source identifiers. Next, as shown at blocks 734 and 736, firmware 136 resets the shadow MASK bit 446 for the identified interrupt source to enable (unmask) interrupts and restores the value of the VecPri priority field 406 from shadow priority field 436. Thereafter, the process terminates at block 738.

Figure 8:
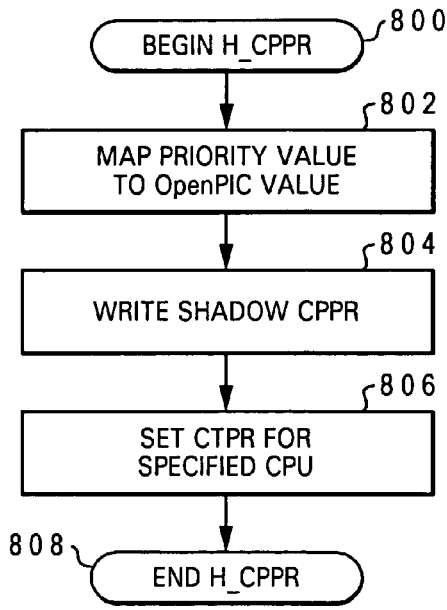
FIG. 8 is a high level logical flowchart of an exemplary process for writing an emulated current processor priority register (CPPR) in accordance with the present invention.

With reference now to FIG. 8, there is a high level logical flowchart of an exemplary process for writing an emulated current processor priority register (CPPR) in accordance with the present invention. As noted above, the PowerPC CPPR specifies the current priority of the associated processor.

As illustrated, the process of FIG. 8 begins at block 800 in response to receipt by hypervisor 130 of an H_CPPR call from an operating system instance 132, where the H_CPPR call includes a desired priority for a specified processing unit 102. The process then proceeds to block 802, which depicts firmware 136 mapping the PowerPC priority value to a corresponding OpenPIC priority. Next, as shown at blocks 804 and 806, hypervisor 130 writes the PowerPC priority value to the shadow CPPR of the specified processing unit 102 and writes the corresponding OpenPIC priority value to the CTPR of the specified processing unit 102. Thereafter, the process terminates at block 808. It will be appreciated that although the illustrated method stores PowerPC priority values in the shadow CPPR, the shadow CPPR could alternatively store the priority value in OpenPIC format.

Figure 9:
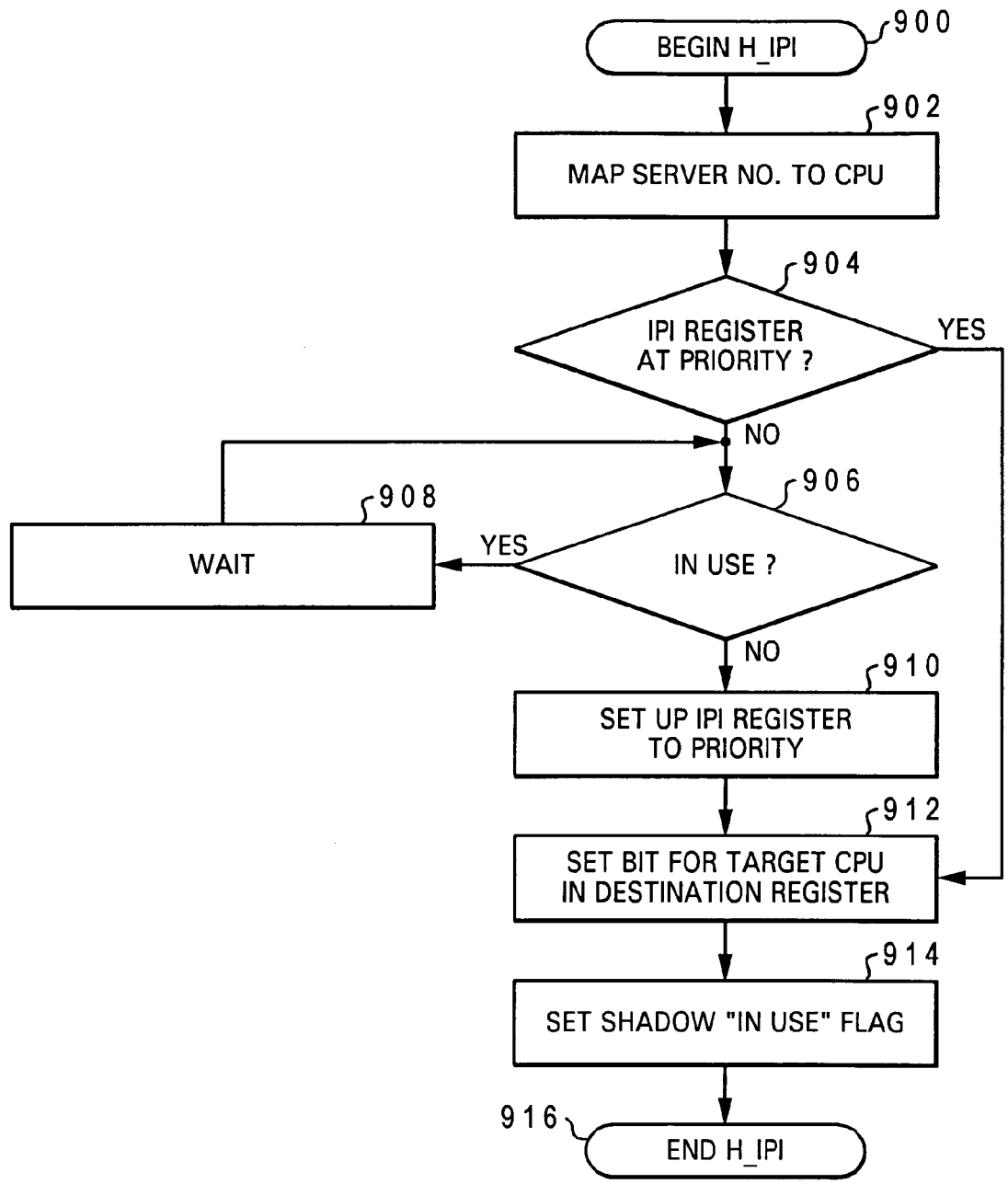
FIG. 9 is a high level logical flowchart of an exemplary process for signaling an inter-processor interrupt (IPI) in accordance with the present invention.

Referring now to FIG. 9, there is a high level logical flowchart of an exemplary process for signaling an inter-processor interrupt (IPI) in accordance with the present invention. The process of FIG. 9 begins at block 900 in response to hypervisor 130 receiving from an operating system instance 132 an H_IPI call specifying a desired server (processing unit) to interrupt in the emulated PowerPC architecture and a priority of the requested interprocessor interrupt. In response to receipt of the H_IPI call, hypervisor 130 maps the specified server from the emulated PowerPC interrupt architecture to a processing unit 102.

Next, hypervisor 130 determines at block 904 whether or not the OpenPIC IPI dispatch port 0 register of the specified processing unit 102 is currently set to the priority specified by the H_IPI request. As noted above, although the OpenPIC interrupt architecture specifies 4 IPI dispatch command ports per processor, hypervisor 130 preferably logically ORs the values of these registers to implement a single IPI dispatch port (i.e., MFRR) as in the PowerPC interrupt architecture. If a determination is made at block 904 that the IPI dispatch port 0 is set to the requested priority, hypervisor 130 asserts the requested IPI by setting the appropriate bit for the target processing unit 102 in the destination register of the requesting processing unit 102, as shown at block 912.

If, however, the appropriate priority is not currently set in the OpenPIC IPI dispatch port 0 register, hypervisor 130 determines at block 906 whether or not the OpenPIC IPI dispatch port 0 register is currently in use. In a preferred embodiment, a respective shadow "in use" flag is implemented in memory for each processing unit 102, and this determination is made by reference to the "in use" flag for the specified processing unit 102. If the OpenPIC IPI dispatch port 0 for the specified processing unit 102 is currently in use, the process returns to block 906 after waiting a selected interval at block 908. Once the shadow "in use" flag indicates that the OpenPIC IPI dispatch port 0 register is no longer in use, hypervisor 130 sets the desired OpenPIC priority within the OpenPIC IPI dispatch port 0 register of the requesting processing unit 102 at block 910 prior to asserting the IPI at block 912. Hypervisor 130 then sets the shadow "in use" flag for the specified processing unit 102 at block 914. Following block 914, the process terminates at block 916.

Figure 10A:
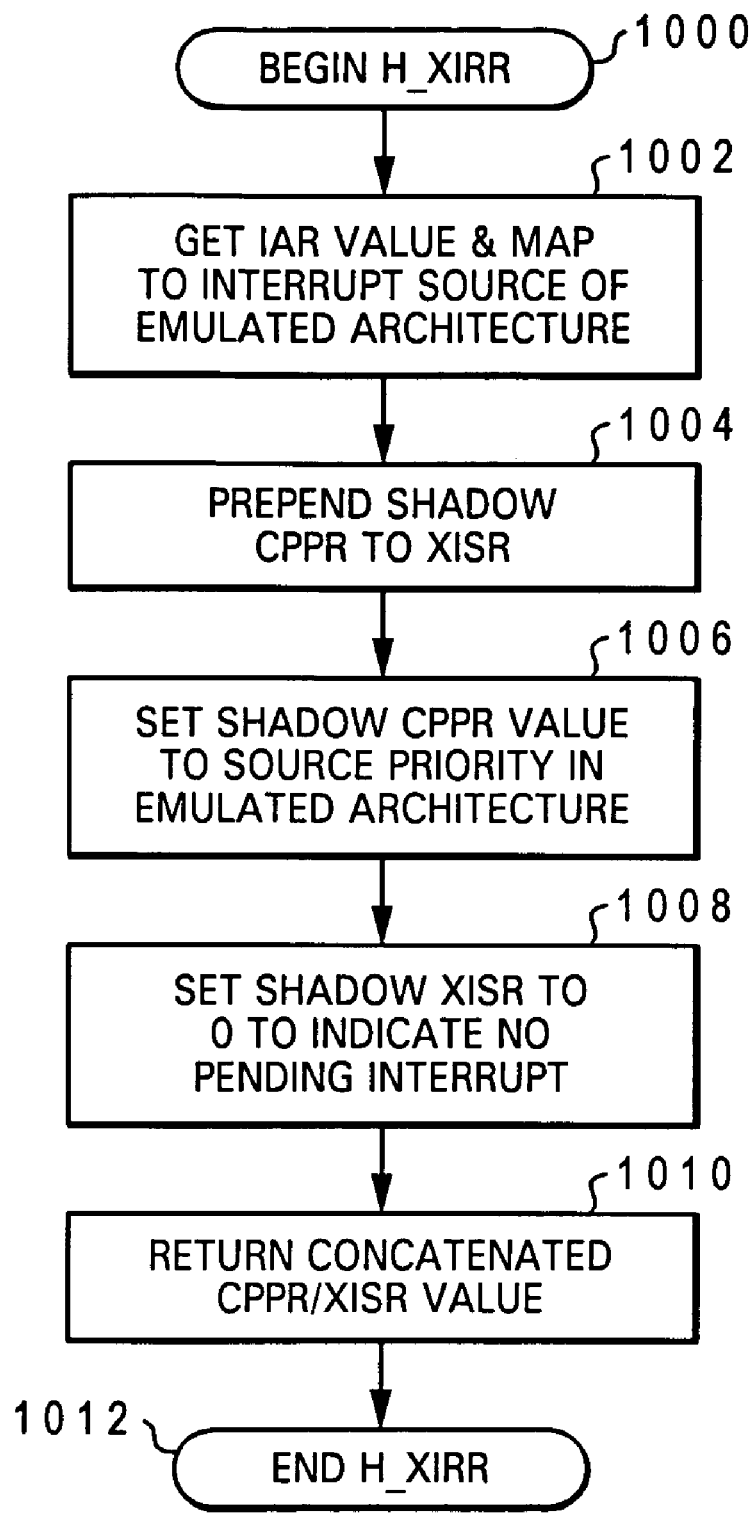
FIG. 10A is a high level logical flowchart of an exemplary process for reading an emulated external interrupt request register (XIRR) in accordance with the present invention.

With reference now to FIG. 10A, there is illustrated a high level logical flowchart of an exemplary process for reading an emulated external interrupt request register (XIRR) in accordance with the present invention. The process begins at block 1000 in response to hypervisor 130 receiving from an operating system instance 132 an H_XIRR call requesting an identity of an interrupt source that asserted an interrupt to a processing unit 102. In response to receipt of the H_XIRR call, hypervisor 130 reads the value of the OpenPIC LAR from the OpenPIC IMA and maps the IAR value, which is the value of the VecPri vector 402 for the interrupt source, to a PowerPC BUID/SRC pair forming the emulated XISR value for the requesting interrupt source, as illustrated at block 1002. In order to form the value of an emulated XIRR 310, hypervisor 130 prepends the shadow CPPR value to the BUID/SRC pair, as depicted at block 1004.

In addition, as shown at block 1006 and 1008, hypervisor 130 sets the value of the shadow CPPR to the PowerPC priority of the interrupt source and sets the shadow XISR to 0 to acknowledge the interrupt and indicate that no interrupts are currently pending. Hypervisor 130 then returns the concatenated CPPR/XISR values formed at block 1004 to the operating system instance 132 as the requested XIRR value at block 1010. Thereafter, the process terminates at block 1012.

Figure 10B:
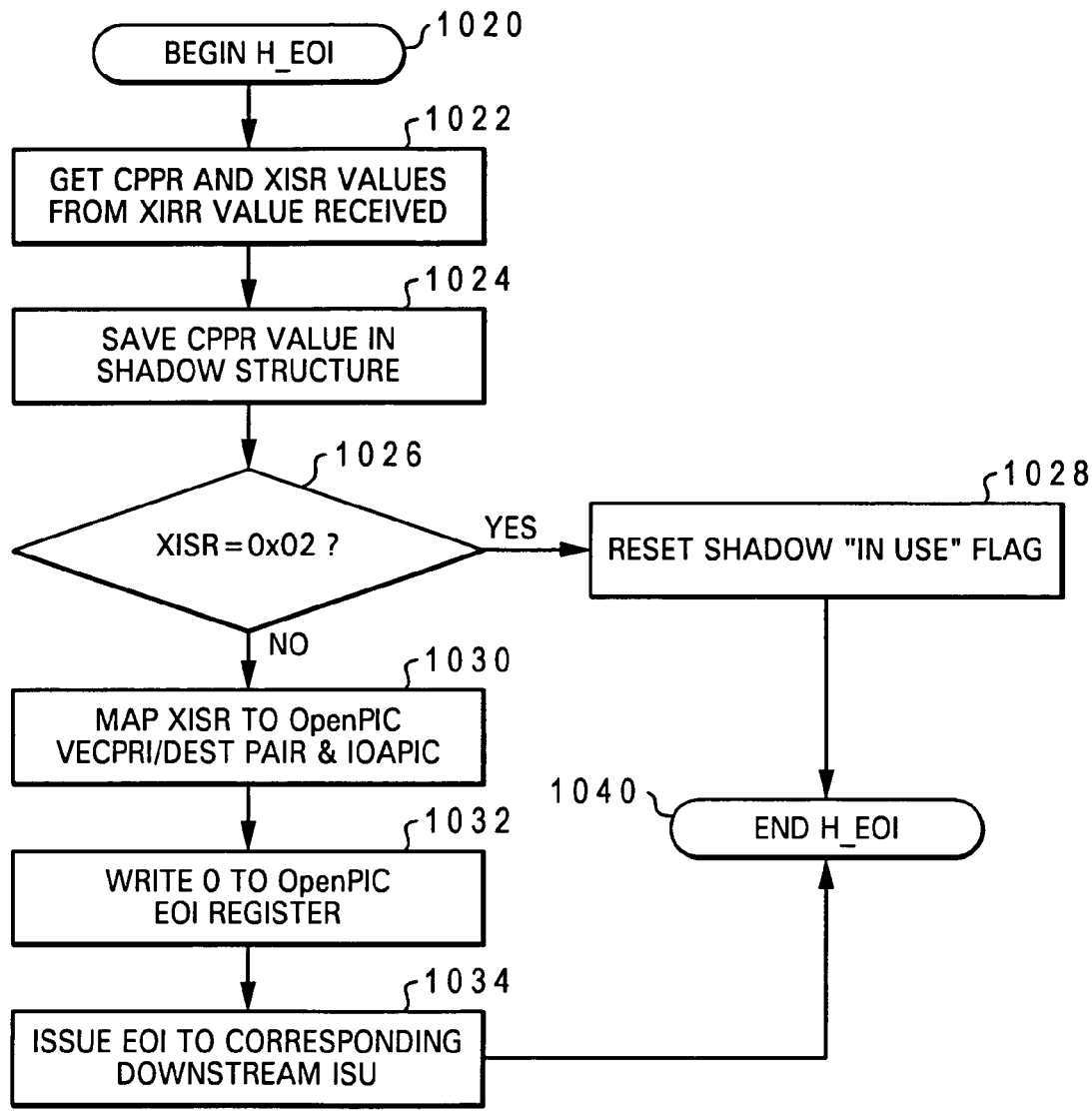
FIG. 10B is a high level logical flowchart of an exemplary process for issuing an end-of-interrupt EOI in accordance with the present invention.

Referring now to FIG. 10B, there is depicted a high level logical flowchart of an exemplary process for issuing an end-of-interrupt (EOI) in accordance with the present invention. The process depicted in FIG. 10B begins at block 1020 in response to receipt by hypervisor 130 of an H_EOI call from an operating system instance 132. Because the PowerPC interrupt architecture specifies that each external interrupt and IPI receive a specific, corresponding EOI, the EOI call includes an XIRR value comprising a new CPPR value for the handling processing unit 102 and the BUID/SRC of the requesting interrupt source. Thereafter, the process proceeds to block 1022, which illustrates extracting the constituent CPPR and XISR values from the XIRR value received in the H_EOI call. Hypervisor 130 saves the CPPR value in the shadow CPPR for the calling processing unit 102, as shown at block 1024, and determines at block 1026 whether or not the XISR value is 0x02, that is, whether the EOI pertains to an IPI. If so, hypervisor 130 resets an "in use" flag in OpenPIC IPI dispatch port 0, as depicted at block 1028, but otherwise ignores the EOI call because OpenPIC does not require EOIs for IPIs. Thereafter, the process terminates at block 1040.

If, on the other hand, hypervisor 130 determines at block 1026 that the EOI does not pertain to an IPI, the process proceeds to block 1030. Block 1030 depicts hypervisor 130 mapping the XISR value extracted at block 1022 to an OpenPIC VecPri and Dest register pair within upstream ISU 120 and a corresponding IOAPIC register pair within downstream ISU 114. Hypervisor 130 then writes a value of '0' into the OpenPIC EOI register the OpenPIC IMA at block 1032. Hypervisor 130 also issues an EOI to the corresponding IOAPIC register in downstream ISU 114. Thereafter, the process terminates at block 1040.

As has been described, the present invention provides methods, systems and program products for emulating an interrupt architecture in a data processing system. In accordance with the present invention, the interrupt architecture implemented by one or more operating system instances is independent of the underlying interrupt architecture implemented by the interrupt presentation unit, which is in turn independent of the underlying interrupt architecture implemented by the downstream interrupt source units. By layering the interrupt architectures in this manner, constraints in data processing system design otherwise enforced by interrupt architecture incompatibilities are eliminated.

While the invention has been particularly shown as described with reference to a preferred embodiment, it will be understood by those skilled in the art that various changes in form and detail may be made therein without departing from the spirit and scope of the invention. For example, although aspects of the present invention have been described with respect to a computer system executing software that directs the functions of the present invention, it should be understood that present invention may alternatively be implemented as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A method of data processing in a data processing system, said method comprising:
   interrupt emulation code receiving from an operating system a first call requesting access to a first resource in a first interrupt architecture;

in response to receipt by the interrupt emulation code of the first call:
said interrupt emulation code mapping said first resource to a second resource in interrupt hardware of said data processing system, said mapping including determining an identifier of said second resource in a different second interrupt architecture; and
said interrupt emulation code initiating access to said second resource implemented by said interrupt hardware.

2. The method of claim 1, wherein:
said interrupt emulation code includes first and second interrupt emulation code;
said first resource belongs to an interrupt management area of a processor in said data processing system;
said mapping comprises said first interrupt emulation code mapping said first resource to a second resource; and
said method further comprises:
in response to receipt by said interrupt emulation code of a second call by an operating system targeting a third resource associated with an external interrupt source in said data processing system, said second interrupt emulation code mapping said third resource to a fourth resource in said second interrupt architecture.

3. The method of claim 1, wherein said initiating access comprises translating an identifier of the second resource from said second interrupt architecture to a different third interrupt architecture.

4. The method of claim 1, wherein said mapping includes a mapping storage location of said first resource.

5. The method of claim 1, wherein said mapping includes mapping a priority value specified in said first call from said first interrupt architecture to said second interrupt architecture.

6. The method of claim 1, wherein:
said second resource includes a priority field specifying a priority in said second interrupt architecture of an external interrupt source;
said method further comprises:
providing a shadow priority field corresponding to said priority field; and
prior to accessing said priority field, copying a value of said priority field to the shadow priority field.

7. A program product comprising:
a computer usable storage medium; and
interrupt emulation code within said computer usable storage medium, wherein said interrupt emulation code, responsive to receiving from an operating system a first call requesting access to a first resource in a first interrupt architecture:
(1) maps said first resource to a second resource in interrupt hardware of a data processing system by determining an identifier of said second resource in a different second interrupt architecture; and
(2) initiates access to said second resource implemented by said interrupt hardware.

8. The program product of claim 7, wherein:
said interrupt emulation code includes first and second interrupt emulation code;
said first resource belongs to an interrupt management area of a processor in said data processing system;
said first interrupt emulation code maps said first resource to a second resource; and
wherein said interrupt emulation code, responsive to receipt of a second call by an operating system targeting a third resource associated with an external interrupt source in said data processing system, maps said third resource to a fourth resource in said second interrupt architecture utilizing said second interrupt emulation code.

9. The program product of claim 7, wherein said interrupt emulation code initiates access to said second resource by translating an identifier of the second resource from said second interrupt architecture to a different third interrupt architecture.

10. The program product of claim 7, wherein said interrupt emulation code maps a storage location of said first resource.

11. The program product of claim 7, wherein said interrupt emulation code maps a priority value specified in said first call from said first interrupt architecture to said second interrupt architecture.

12. The program product of claim 7, wherein:
said second resource includes a priority field specifying a priority in said second interrupt architecture of an external interrupt source;
said interrupt emulation code provides a shadow priority field corresponding to said priority field and, prior to accessing said priority field, copies a value of said priority field to the shadow priority field.

13. A data processing system, comprising:
one or more processing units;
interrupt hardware coupled to the one or more processing units;
a memory coupled to the one or more processing units, said memory including:
an operating system; and
interrupt emulation code that, responsive to receiving from the operating system a first call requesting access to a first resource in a first interrupt architecture:
(1) maps said first resource to a second resource in said interrupt hardware of the data processing system by determining an identifier of said second resource in a different second interrupt architecture; and
(2) initiates access to said second resource implemented by said interrupt hardware.

14. The data processing system of claim 13, wherein:
said interrupt emulation code includes first and second interrupt emulation code;
said first resource belongs to an interrupt management area of a processing unit among said one or more processing units;
said first interrupt emulation code maps said first resource to a second resource; and
wherein said interrupt emulation code, responsive to receipt of a second call by an operating system targeting a third resource associated with an external interrupt source within said interrupt hardware, maps said third resource to a fourth resource in said second interrupt architecture utilizing said second interrupt emulation code.

15. The data processing system of claim 13, wherein said interrupt emulation code initiates access to said second resource by translating an identifier of the second resource from said second interrupt architecture to a different third interrupt architecture.

16. The data processing system of claim 13, wherein said interrupt emulation code maps a storage location of said first resource.

17. The data processing system of claim 13, wherein said interrupt emulation code maps a priority value specified in said first call from said first interrupt architecture to said second interrupt architecture.

18. The data processing system of claim 13, wherein:
said second resource includes a priority field specifying a priority in said second interrupt architecture of an external interrupt source within said interrupt hardware;
said memory includes a shadow priority field corresponding to said priority field; and
said interrupt emulation code, prior to accessing said priority field, copies a value of said priority field to the shadow priority field.

* * * * *